(12) United States Patent
Chung et al.

(10) Patent No.: US 8,557,912 B2
(45) Date of Patent: Oct. 15, 2013

(54) THERMOPLASTIC RESIN COMPOSITION

(75) Inventors: Jin Hwa Chung, Uiwang-si (KR); Kee Hae Kwon, Uiwang-si (KR); Il Jin Kim, Uiwang-si (KR); Kwang Soo Park, Uiwang-si (KR); Ja Kwan Koo, Uiwang-si (KR)

(73) Assignee: Cheil Industries Inc., Gumi-si (KR)

(*) Notice: Subject to any disclaimer, the term of this patent is extended or adjusted under 35 U.S.C. 154(b) by 79 days.

(21) Appl. No.: 12/961,877

(22) Filed: Dec. 7, 2010

(65) Prior Publication Data

US 2012/0016068 A1 Jan. 19, 2012

(30) Foreign Application Priority Data

Jul. 13, 2010 (KR) ........................ 10-2010-0067518

(51) Int. Cl.
| | |
|---|---|
| C08F 290/04 | (2006.01) |
| C08F 283/02 | (2006.01) |
| C08F 283/08 | (2006.01) |
| C08F 20/00 | (2006.01) |
| C08L 73/00 | (2006.01) |
| C08L 77/00 | (2006.01) |
| C08L 51/00 | (2006.01) |
| C08L 61/04 | (2006.01) |
| C08L 51/04 | (2006.01) |
| C08L 43/00 | (2006.01) |
| C08L 79/08 | (2006.01) |
| C08J 3/22 | (2006.01) |

(52) U.S. Cl.
USPC ........... 524/504; 524/508; 524/513; 524/521; 524/525; 525/66; 525/67; 525/68; 525/72; 525/209; 525/392; 525/421; 525/422; 525/445; 525/464; 525/479

(58) Field of Classification Search
USPC ........... 524/502, 503, 504, 547, 279; 525/70, 525/72, 80, 101; 526/279
IPC ........................ C08L 25/12,25/14, 51/04, 33/20
See application file for complete search history.

(56) References Cited

U.S. PATENT DOCUMENTS

| | | | | |
|---|---|---|---|---|
| 3,898,300 A | * | 8/1975 | Hilliard | 525/106 |
| 4,634,734 A | | 1/1987 | Hambrecht et al. | |
| 5,274,031 A | | 12/1993 | Eichenauer et al. | |
| 6,063,889 A | * | 5/2000 | Friebe et al. | 528/32 |
| 6,111,024 A | | 8/2000 | McKee et al. | |
| 6,337,371 B2 | * | 1/2002 | Kurata et al. | 525/63 |
| 6,380,304 B1 | * | 4/2002 | Vanspeybroeck et al. | 525/70 |
| 6,849,689 B2 | * | 2/2005 | Yamada et al. | 525/71 |
| 2007/0287799 A1 | * | 12/2007 | Ha et al. | 525/71 |
| 2010/0240831 A1 | | 9/2010 | Kim et al. | |
| 2011/0021677 A1 | | 1/2011 | Kwon et al. | |
| 2011/0160377 A1 | * | 6/2011 | Chung et al. | 524/504 |

FOREIGN PATENT DOCUMENTS

| | | |
|---|---|---|
| CN | 1377913 A | 11/2002 |
| DE | 19614845 A1 | 10/1997 |
| EP | 0370344 A2 | 5/1990 |
| JP | 08-239544 A * | 9/1996 |
| JP | 08239544 A * | 9/1996 |
| JP | H08-239544 A * | 9/1996 |
| KR | 648114 B1 * | 11/2006 |
| KR | 885819 B1 | 2/2009 |
| WO | 2009/128601 A | 10/2009 |

OTHER PUBLICATIONS

JP H08-239544A (1996), machine translation, JPO Advanced Industrial Property Network (AIPN).*
KR 648114B1 (2006), machine translation, KIPO Korean Patent Information Online Network (K-PION).*
JP 08239544 A (1996), machine translation, JPO Advanced Industrial Property Network (AIPN).*
KR 648114 B1 (2006), machine translation, KIPO Korean Patent Information Online Network (K-PION).*
Chinese Office Action in counterpart Chinese Application No. 201010597679.9 dated Aug. 27, 2012, pp. 1-5.
European Search Report in counterpart European Application No. 10194938.6 dated Jul. 21, 2011, pp. 1-5.

* cited by examiner

*Primary Examiner* — David W. Wu
*Assistant Examiner* — Josephine Chang
(74) *Attorney, Agent, or Firm* — Summa, Additon & Ashe, P.A.

(57) ABSTRACT

An aromatic vinyl-based thermoplastic resin composition includes a rubber-modified acrylic graft copolymer and a branched aromatic vinyl copolymer resin including a silicon compound.

15 Claims, No Drawings

THERMOPLASTIC RESIN COMPOSITION

CROSS-REFERENCE TO RELATED APPLICATIONS

This application claims priority under 35 USC Section 119 from Korean Patent Application No. 10-2010-0067518, filed Jul. 13, 2010, in the Korean Intellectual Property Office, the entire disclosure of which is incorporated herein by reference.

FIELD OF THE INVENTION

The present invention relates to an aromatic vinyl-based thermoplastic resin composition.

BACKGROUND OF THE INVENTION

Weather resistant thermoplastic acrylonitrile-styrene-acrylate ("ASA") resins have a lower specific gravity and better physical properties, for example, in terms of moldability and impact resistance than glass and metals. With the recent trend toward economical, large-sized and lightweight electrical and electronic products, plastic materials have rapidly replaced glass and metal materials and have extended their range of application in electrical and electronic products as well as automotive components. Thus, there is a rapidly growing need for resins that have improved weather, chemical and light resistance, which is a function required for use as exterior materials, along with good resistance to external impact and high processability.

Particularly, ASA resins are widely used as weather resistant thermoplastic resins. General styrene-based thermoplastic acrylonitrile-butadiene-styrene (ABS) copolymer resins use butadiene rubbers having unstable double bonds, whereas ASA resins use acrylic rubbers to achieve improved weather resistance and light resistance. An ASA resin is typically produced by graft polymerization of a styrene monomer as an aromatic vinyl compound and an acrylonitrile monomer as an unsaturated nitrile compound in the presence of an acrylic rubber polymer to obtain a graft ASA resin ("g-ASA resin"), which is then blended with a styrene-acrylonitrile copolymer resin ("SAN resin"). Such ASA resins exhibit superior resistance to impact, weather, chemicals and heat, have high mechanical strength, and are easy to mold. Due to these advantages, ASA resins are used in a wide variety of applications, including automotive components and interior/exterior materials, electrical and electronic products, office appliances, toys, among others.

With the varying properties required for automotive interior/exterior materials, combinations of various characteristics are currently required. Because of complicated structures and strategies for premium appearance of automotive interior/exterior materials, high impact strength and flowability are considered particularly important. Under these circumstances, there is an increasing need for ASA resins that have excellent impact resistance and flowability while maintaining their resistance to weather and chemicals.

Attempts have been made to improve the impact resistance of ASA resins by increasing the molecular weight of SAN resins or the content of g-ASA or including diene graft copolymers in the ASA resins. These attempts have succeeded in improving impact resistance but have a drawback in that flowability and heat resistance are deteriorated.

SUMMARY OF THE INVENTION

The present inventors have found that a thermoplastic resin composition including a branched aromatic vinyl copolymer resin including a silicon compound can exhibit superior impact resistance and can also have improved flowability due to the branched structure. As a result, the composition can have good moldability. The composition of the invention further can have good weather resistance.

In accordance with an exemplary embodiment of the invention, there is provided an aromatic vinyl-based thermoplastic resin composition comprising:

(A) about 10% to about 99% by weight of a thermoplastic resin including (a1) a rubber-modified acrylic graft copolymer, and (B) about 1% to about 90% by weight of a branched aromatic vinyl copolymer resin including a silicon compound.

The thermoplastic resin (A) may further include (a2) an aromatic vinyl copolymer resin.

The branched aromatic vinyl copolymer resin (B) may be selected from: copolymers including (b1) an aromatic vinyl monomer, (b2) an unsaturated nitrile monomer, (b3) a (meth) acrylate monomer, and (b4) a silicon compound having two or more unsaturated groups; and mixtures of the copolymers. The branched aromatic vinyl copolymer resin (B) may include about 10% to about 85% by weight of the aromatic vinyl monomer (b1), about 10% to about 85% by weight of the unsaturated nitrile monomer (b2), about 1% to about 50% by weight of the (meth)acrylate monomer (b3) and about 0.1% to about 20% by weight of the silicon compound (b4).

The present invention also provides a molded article produced for example by extrusion or injection molding of the aromatic vinyl-based thermoplastic resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Unless otherwise stated herein, the term "(meth)acrylate" is intended to include "acrylate" and "methacrylate."

The present invention provides an aromatic vinyl-based thermoplastic resin composition comprising (A) about 10% to about 99% by weight of a thermoplastic resin including (a1) a rubber-modified acrylic graft copolymer, and (B) about 1% to about 90% by weight of a branched aromatic vinyl copolymer resin including a silicon compound.

The thermoplastic resin (A) may further include (a2) an aromatic vinyl copolymer resin.

The present invention will now be described in more detail.

(A) Thermoplastic Resin

The thermoplastic resin (A) includes (a1) a rubber-modified acrylic graft copolymer.

In one embodiment, the rubber-modified acrylic graft copolymer (a1) may be used alone as the thermoplastic resin (A).

In another embodiment, the thermoplastic resin (A) may be a mixture of (a1) the rubber-modified acrylic graft copolymer and (a2) an aromatic vinyl copolymer resin.

The rubber-modified acrylic graft copolymer (a1) may be produced by graft polymerization of a monomer mixture including an aromatic vinyl compound and an unsaturated nitrile compound onto an acrylate rubber polymer. The monomer mixture may be polymerized by various processes known in the art. Examples of suitable polymerization processes include, but are not necessarily limited to, emulsion polymerization, suspension polymerization, solution polymerization and bulk polymerization.

The acrylate rubber polymer may be an alkyl acrylate rubber, such as a $C_2$-$C_{20}$ alkyl acrylate rubber. Non-limiting examples of the alkyl acrylate rubber include butyl acrylate polymers, ethyl hexyl acrylate rubber polymers, the like, and mixtures thereof.

In exemplary embodiments, the rubber may have a particle diameter of about 0.05 μm to about 1 μm, for example about 0.1 μm to about 0.5 μm. In some embodiments, the particle diameter of the rubber can range from about 0.05, 0.06, 0.07, 0.08, 0.09, 0.1, 0.2, 0.3, 0.4, 0.5, 0.6, 0.7, 0.8, 0.9, or 1 μm. Further, according to some embodiments of the present invention, the particle diameter of the rubber can be in a range from about any of the foregoing sizes to about any other of the foregoing sizes.

Examples of aromatic vinyl compounds suitable for use in the production of the rubber-modified acrylic graft copolymer (a1) include, but are not necessarily limited to, styrene, α-methylstyrene, p-methylstyrene, vinyltoluene, 2,4-dimethylstyrene, halogen-substituted styrene, C1-C10 alkyl-substituted styrene, and the like. These aromatic vinyl compounds may be used alone or as a mixture of two or more thereof.

Examples of unsaturated nitrile compounds suitable for use in the production of the rubber-modified acrylic graft copolymer (a1) include, but are not necessarily limited to, acrylonitrile, methacrylonitrile, and the like. These unsaturated nitrile compounds may be used alone or as a mixture of two or more thereof.

The rubber-modified acrylic graft copolymer (a1) may include about 20% to about 70% by weight of the acrylate rubber polymer, about 15% to about 64% by weight of the aromatic vinyl compound and about 6% to about 40% by weight of the unsaturated nitrile compound. The rubber-modified acrylic graft copolymer (a1) including acrylate rubber, aromatic vinyl compound and unsaturated nitrile compound in amounts within these ranges may have satisfactory impact resistance.

In some embodiments, the amount of the acrylate rubber polymer can range from about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of the acrylate rubber polymer can be in a range from about any of the foregoing amounts to about any other of the foregoing amounts.

In some embodiments, the aromatic vinyl monomer may be used in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, or 64% by weight. Further, according to some embodiments of the present invention, the amount of the aromatic vinyl monomer can be in a range from about any of the foregoing amounts to about any other of the foregoing amounts.

In some embodiments, the unsaturated nitrile compound may be used in an amount of about 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of the unsaturated nitrile compound can be in a range from about any of the foregoing amounts to about any other of the foregoing amounts.

In an embodiment, the rubber-modified acrylic graft copolymer (a1) is a graft acrylate-styrene-acrylonitrile (g-ASA) resin produced by graft polymerization of aromatic vinyl monomers, such as styrene, and acrylonitrile monomers in the presence of the acrylate rubber polymer.

The rubber-modified acrylic graft copolymer (a1) may have a core-shell structure.

The thermoplastic resin (A) may further include the aromatic vinyl copolymer resin (a2).

The aromatic vinyl copolymer resin (a2) is a copolymer of about 50% to about 95% by weight of an aromatic vinyl compound and about 5% to about 50% by weight of a monomer copolymerizable with the aromatic vinyl compound.

Examples of aromatic vinyl compounds suitable for use in the production of the aromatic vinyl copolymer resin (a2) include, but are not necessarily limited to, styrene, α-methylstyrene, p-methylstyrene, vinyltoluene, 2,4-dimethylstyrene, halogen-substituted styrene, C1-C10 alkyl-substituted styrene, and the like. These aromatic vinyl compounds may be used alone or as a mixture of two or more thereof.

Examples of monomers copolymerizable with the aromatic vinyl compound for the production of the aromatic vinyl copolymer resin (a2) include, but are not necessarily limited to, unsaturated nitrile compounds, alkyl (meth)acrylates, maleic anhydride, maleimide compounds, and the like. These copolymerizable monomers may be used alone or as a mixture of two or more thereof. The monomers may be polymerized by various processes known in the art, for example, emulsion polymerization, suspension polymerization, solution polymerization and bulk polymerization.

Examples of unsaturated nitrile compounds suitable for use in the production of the aromatic vinyl copolymer resin (a2) include, but are not necessarily limited to, acrylonitrile, methacrylonitrile, and the like. These unsaturated nitrile compounds may be used alone or as a mixture of two or more thereof.

Examples of the alkyl (meth)acrylates include, but are not necessarily limited to, $C_1$-$C_8$ alkyl methacrylates, $C_1$-$C_8$ alkyl acrylates, and the like, and mixtures thereof. The $C_1$-$C_8$ alkyl methacrylates and the $C_1$-$C_8$ alkyl acrylates are alkyl esters of methacrylic acid and acrylic acid, respectively, and are esters obtained from monohydric alcohols having one to eight carbon atoms. The alkyl (meth)acrylates are not limited, and specific examples thereof are methyl methacrylate, ethyl methacrylate, ethyl acrylate, methyl acrylate, propyl methacrylate, and the like, and mixtures thereof.

Non-limiting examples of the maleimide compounds include $C_1$-$C_4$ alkyl and phenyl N-substituted maleimides.

Examples of the aromatic vinyl copolymer resin (a2) include without limitation a copolymer of a monomer mixture consisting of styrene, acrylonitrile and optionally methyl methacrylate; a copolymer of a monomer mixture consisting of α-methylstyrene, acrylonitrile and optionally methyl methacrylate; and a copolymer of a monomer mixture consisting of styrene, α-methylstyrene, acrylonitrile and optionally methyl methacrylate.

The aromatic vinyl copolymer resin (a2) can have a weight average molecular weight in the range of about 15,000 to about 250,000 g/mol. Within this range, excellent processability and moldability can be obtained.

In an alternative embodiment, the aromatic vinyl copolymer resin (a2) may be a copolymer of styrene and maleic anhydride. The styrene/maleic anhydride copolymer can be produced by continuous bulk polymerization or solution polymerization. The content ratio of the two monomers may vary over a broad range. In an exemplary embodiment, the amount of the maleic anhydride may range from about 5% to about 50% by weight. The styrene/maleic anhydride copolymer may have a broad molecular weight distribution. As a non-limiting example, the styrene/maleic anhydride copolymer may have an average molecular weight of about 15,000 to about 250,000 g/mol.

In one embodiment, the aromatic vinyl copolymer resin (a2) may be obtained as a by-product in the production of the rubber-modified acrylic graft copolymer (a1). Particularly, a larger amount of the aromatic vinyl copolymer resin (a2) may be generated when an excess of the monomer mixture is grafted onto a small amount of the rubber polymer or an excess of a chain transfer agent is used as a molecular weight modifier. The content of the aromatic vinyl copolymer resin (a2) used for the preparation of the resin composition according to the present invention is not intended to include the content of the by-product obtained in the production of the graft copolymer (a1).

In an embodiment where the thermoplastic resin (A) further includes the aromatic vinyl copolymer resin (a2), the rubber-modified acrylic graft copolymer (a1) and the aromatic vinyl copolymer resin (a2) may be included in a weight ratio of about 1 to about 2:about 1 to about 3. Within this range, excellent processability and mechanical properties can be obtained.

In another embodiment, the thermoplastic resin (A) may include about 30% to about 55% by weight of the rubber-modified acrylic graft copolymer (a1) and about 45% to about 70% by weight of the aromatic vinyl copolymer resin (a2).

In some embodiments, the thermoplastic resin (A) may include the rubber-modified acrylic graft copolymer (a1) in an amount of about 30, 31, 32, 33, 34, 35, 36, 37, 38, 39, 40, 41, 42, 43, 44, 45, 46, 47, 48, 49, 50, 51, 52, 53, 54, or 55% by weight. Further, according to some embodiments of the present invention, the amount of the rubber-modified acrylic graft copolymer (a1) can be in a range from about any of the foregoing amounts to about any other of the foregoing amounts.

In some embodiments, the thermoplastic resin (A) may include the aromatic vinyl copolymer resin (a2) in an amount of about 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of the aromatic vinyl copolymer resin (a2) can be in a range from about any of the foregoing amounts to about any other of the foregoing amounts.

The aromatic vinyl-based thermoplastic resin composition of the invention may include the thermoplastic resin (A) in an amount ranging from about 10% to about 99% by weight, for example about 55% to about 90% by weight, and as another example about 70% to about 85% by weight, based on the total weight of the composition. Within this range, appropriate impact strength and heat resistance of the thermoplastic resin (A) can be ensured. In some embodiments, the aromatic vinyl-based thermoplastic resin composition of the invention can include the thermoplastic resin (A) in an amount of about 10, 11, 12, 13, 14, 15, 16, 17, 18, 29, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% by weight. Further, according to some embodiments of the present invention, the amount of the thermoplastic resin (A) can be in a range from about any of the foregoing amounts to about any other of the foregoing amounts.

(B) Branched Aromatic Vinyl Copolymer Resin

The branched aromatic vinyl copolymer resin (B) includes a silicon compound.

In exemplary embodiments, the branched aromatic vinyl copolymer resin (B) may be selected from: copolymers of (b1) an aromatic vinyl monomer, (b2) an unsaturated nitrile monomer, (b3) a (meth)acrylate monomer, and (b4) a silicon compound having two or more unsaturated groups; and mixtures of the copolymers.

In one embodiment, the branched aromatic vinyl copolymer resin (B) may be a copolymer of (b1) about 10% to about 85% by weight of the aromatic vinyl monomer, (b2) about 10% to about 85% by weight of the unsaturated nitrile monomer, (b3) about 1% to about 50% by weight of the (meth)acrylate monomer, and (b4) about 0.1% to about 20% by weight of the silicon compound.

In another embodiment, the branched aromatic vinyl copolymer resin (B) may be a copolymer of (b1) about 50% to about 75% by weight of the aromatic vinyl monomer, (b2) about 20% to about 45% by weight of the unsaturated nitrile monomer, (b3) about 3% to about 15% by weight of the (meth)acrylate monomer, and (b4) about 0.5% to about 10% by weight of the silicon compound.

The branched aromatic vinyl copolymer resin (B) can be produced by processes commonly known in the art, for example, bulk polymerization, emulsion polymerization and suspension polymerization.

The branched aromatic vinyl copolymer resin (B) is characterized by the inclusion of the silicon compound having a high molecular weight and capable of improving the impact resistance of the resin after copolymerization and a branched structure capable of improving the flowability of the resin.

Examples of aromatic vinyl monomers (b1) suitable for use in the production of the branched aromatic vinyl copolymer resin (B) include, but are not necessarily limited to, styrene, p-methylstyrene, α-methylstyrene, halogen-substituted styrene, C1-C10 alkyl-substituted styrene, and the like. These aromatic vinyl monomers may be used alone or as a mixture of two or more thereof.

The aromatic vinyl monomer (b1) may be present in an amount of about 10% to about 85% by weight, for example about 50% to about 75% by weight, and as another example about 55% to about 70% by weight, based on the total weight of the branched aromatic vinyl copolymer resin (B). When the content of the aromatic vinyl monomer (b1) is within the range defined above, the impact resistance and flowability of the styrene resin can be both improved without any deterioration in the heat and weather resistance of the styrene resin.

In some embodiments, the aromatic vinyl monomer may be used in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85% by weight. Further, according to some embodiments of the present invention, the amount of the aromatic vinyl monomer can be in a range from about any of the foregoing amounts to about any other of the foregoing amounts.

Examples of unsaturated nitrile monomers (b2) suitable for use in the production of the branched aromatic vinyl copolymer resin (B) include, but are not necessarily limited to, acrylonitrile, methacrylonitrile, ethacrylonitrile, phenylacrylonitrile, α-chloroacrylonitrile, and the like. These unsaturated nitrile monomers may be used alone or as a mixture of two or more thereof.

The unsaturated nitrile monomer (b2) may be present in an amount of about 10% to about 85% by weight, for example about 20% to about 50% by weight, and as another example about 25% to about 45% by weight, based on the total weight of the branched aromatic vinyl copolymer resin (B). When the content of the unsaturated nitrile monomer (b2) is within the range defined above, the impact resistance and flowability of the styrene resin can be improved simultaneously without impairing the heat and weather resistance of the styrene resin.

In some embodiments, the unsaturated nitrile compound may be used in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85% by weight. Further, according to some embodiments of the present invention, the amount of the unsaturated nitrile compound can be in a range from about any of the foregoing amounts to about any other of the foregoing amounts.

The (meth)acrylate monomer (b3) may include an aromatic (meth)acrylate, an aliphatic (meth)acrylate, or a combination thereof having a structure represented by Formula 1, Formula 2, or a combination thereof:

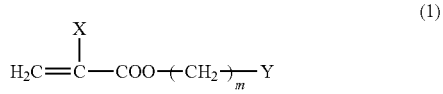

(1)

wherein m is an integer from 0 to 20, X is hydrogen or methyl, and Y is methyl, cyclohexyl, phenyl, benzyl, methylphenyl, methylethylphenyl, methoxyphenyl, cyclohexylphenyl, chlorophenyl, bromophenyl, phenylphenyl or benzylphenyl;

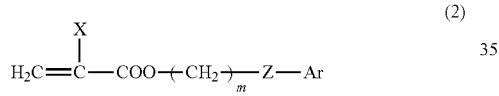

(2)

wherein m is an integer from 0 to 20, X is hydrogen or methyl, Z is oxygen (O) or sulfur (S), and Ar is phenyl, methylphenyl, methylethylphenyl, methoxyphenyl, cyclohexylphenyl, chlorophenyl, bromophenyl, phenylphenyl or benzylphenyl.

Examples of aromatic and/or aliphatic (meth)acrylates having the structure of Formula 1 and/or 2 include without limitation methyl (meth)acrylate, ethyl (meth)acrylate, propyl (meth)acrylate, butyl (meth)acrylate, hexyl (meth)acrylate, 2-ethylhexyl (meth)acrylate, cyclohexyl methacrylate, phenoxy (meth)acrylate, phenoxyethyl (meth)acrylate, 2-ethylphenoxy (meth)acrylate, 2-ethylthiophenyl (meth) acrylate, 2-ethylaminophenyl (meth)acrylate, phenyl (meth) acrylate, benzyl (meth)acrylate, 2-phenylethyl (meth)acrylate, 3-phenylpropyl (meth)acrylate, 4-phenylbutyl (meth) acrylate, 2-2-methylphenylethyl (meth)acrylate, 2-3-methylphenylethyl (meth)acrylate, 2-4-methylphenylethyl (meth)acrylate, 2-(4-propylphenyl)ethyl (meth)acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl)ethyl (meth) acrylate, 2-(3-chlorophenyl)ethyl (meth)acrylate, 2-(4-chlorophenyl)ethyl (meth)acrylate, 2-(4-bromophenyl)ethyl (meth)acrylate, 2-(3-phenylphenyl)ethyl (meth)acrylate, 2-(4-benzylphenyl)ethyl (meth)acrylate, and the like. These (meth)acrylates may be used alone or as a mixture of two or more thereof.

As other specific examples of the (meth)acrylate monomer (b3), there can be used unsaturated carboxylic acids, acid anhydrides, hydroxyl group-containing esters, and the like. These (meth)acrylate monomers may be used alone or as a mixture of two or more thereof. More specifically, there can be used unsaturated carboxylic acids, including acrylic acid and methacrylic acid; acid anhydrides, including maleic anhydride; hydroxyl group-containing esters, including 2-hydroxyethyl acrylate, 2-hydroxypropyl acrylate and monoglycerol acrylate; and the like; and mixtures thereof.

The (meth)acrylate monomer (b3) may be present in an amount of about 1% to about 50% by weight, for example about 3% to about 20% by weight, and as another example about 5% to about 10% by weight, based on the total weight of the branched aromatic vinyl copolymer resin (B). When the content of the (meth)acrylate monomer (b3) is within the range defined above, sufficient flowability and heat resistance can be achieved.

In some embodiments, the (meth)acrylate monomer (b3) may be used in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the (meth)acrylate monomer (b3) can be in a range from about any of the foregoing amounts to about any other of the foregoing amounts.

The silicon compound (b4) may have a structure represented by Formula 3:

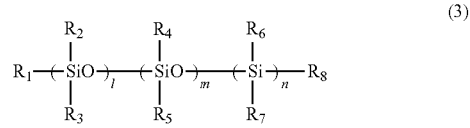

(3)

wherein l, m and n are each independently integers from 0 to 100 (with the proviso that l, m and n are not simultaneously zero), and $R_1$ to $R_8$ are each independently hydrogen, straight chain or branched $C_1$-$C_5$ alkyl, $C_4$-$C_6$ cycloalkyl, unsaturated $C_2$-$C_{12}$ alkyl, $C_6$-$C_{10}$ aryl, hydroxyl, $C_1$-$C_5$ alkoxy, acetoxy, amino, amide, epoxy, carboxyl, halo, ester, isocyanate or mercapto, with the proviso that at least two of $R_1$ to $R_8$ contain a polymerizable unsaturated group.

The silicon compound (b4) has two or more unsaturated groups. The silicon compound (b4) may be a mixture of two or more different compounds that can be represented by Formula 3.

In one embodiment, the silicon compound (b4) may have a linear structure.

In another embodiment, the silicon compound (b4) may have a cyclic structure in which $R_1$ and $R_8$ are bonded together.

Specific examples of silicon compounds suitable for use in the production of the branched aromatic vinyl copolymer resin (B) include, but are not limited to, 2,4,6,8-tetramethyltetravinylcyclotetrasiloxane, 1,3,5-trivinyl-1,1,3,5,5-pentamethyltrisiloxane, 2,4,6-trivinyl-2,4,6-trimethylcyclotrisiloxane, 1,3,5-trivinyl-1,3,5-trimethylcyclosilazane, α,ω-divinylpolydimethylsiloxane, polyvinylmethylsiloxane, 1,3-divinyl-1,1,3,3-tetramethyldisiloxane, and the like. These silicon compounds may be used alone or as a mixture thereof.

The silicon compound (b4) may be present in an amount of about 0.1% to about 20% by weight, for example about 0.5% to about 10% by weight, and as another example about 1% to 5% by weight, based on the total weight of the branched aromatic vinyl copolymer resin (B). When the content of the silicon compound (b4) is within the range defined above, improved impact resistance and flowability can be simultaneously achieved.

In some embodiments, the silicon compound (b4) may be used in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20% by weight. Further, according to some embodiments of the present invention, the amount of the silicon compound (b4) can be in a range from about any of the foregoing amounts to about any other of the foregoing amounts.

The silicon compound (b4) may have a viscosity of about 5,000 cPs or less, for example about 0.001 to about 5,000 cPs. In exemplary embodiment, the viscosity of the silicon compound (b4) may be in the range of about 10 to about 1,000 cPs, for example, about 50 to about 500 cPs. Within this range, the silicon compound (b4) is optimally copolymerizable with the other monomers.

In another embodiment, the vinyl content of the silicon compound (b4) may be in the range of about 0.05 to about 10 mmol/g, for example about 0.1 to about 5 mmol/g. Within this range, an optimum branched structure can be formed to improve the impact resistance and flowability of the resin.

The branched aromatic vinyl copolymer resin (B) may have a weight average molecular weight of about 5,000 to about 5,000,000 g/mol, for example about 50,000 to about 500,000 g/mol. Within this range, the flowability and impact resistance of the thermoplastic resin can be simultaneously enhanced while excellent physical properties of the thermoplastic resin can be maintained.

The aromatic vinyl-based thermoplastic resin composition of the invention can include the branched aromatic vinyl copolymer resin (B) in an amount of about 1% to about 90% by weight, for example about 5% to about 50% by weight, and as another example about 10% to about 50% by weight, based on the total weight of the resin composition. Within this content range, sufficiently improved flowability and heat resistance can be achieved. In some embodiments, the aromatic vinyl-based thermoplastic resin composition of the invention can include the branched aromatic vinyl copolymer resin (B) in an amount of about 1, 2, 3, 4, 5, 6, 7, 8, 9, 10, 11, 12, 13, 14, 15, 16, 17, 18, 29, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the branched aromatic vinyl copolymer resin (B) can be in a range from about any of the foregoing amounts to about any other of the foregoing amounts.

The thermoplastic resin composition of the present invention is characterized by the use of the branched aromatic vinyl copolymer resin (B) to simultaneously achieve improved impact strength and flowability.

In one embodiment, a resin produced from the aromatic vinyl-based thermoplastic resin composition of the present invention may have an Izod impact strength (⅛" thick specimen) of about 7.3 to about 30 kgf·cm/cm, as measured according to the ASTM D256 procedure, and a flow index (220° C., 10 kg) of about 10 to about 50 g/10 min, as measured according to the ASTM D1238 procedure.

The aromatic vinyl-based thermoplastic resin composition of the present invention may optionally further comprise one or more additives depending on intended use. Non-limiting examples of the additives include surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, antistatic agents, pigments, dyes, and flame-proofing agents, the like. These additives may be used alone or as a mixture thereof.

The aromatic vinyl-based thermoplastic resin composition of the present invention can be produced in the form of a molded article by known methods. For example, a plastic injection or compression molded article can be produced by mixing the constituent components and optionally other additives together, melt-extruding the mixture into pellets in an extruder, and molding the pellets. Suitable molding techniques include, for example, extrusion molding, injection molding, calendaring and vacuum forming, but are not particularly limited thereto.

The aromatic vinyl-based thermoplastic resin composition of the present invention can possess excellent physical properties such as weather resistance, high impact strength and good moldability, due to structural modification thereof, and can be highly colorable. Due to these advantages, the thermoplastic resin composition of the present invention is useful in the manufacture of various molded articles. The thermoplastic resin composition of the present invention is particularly applicable to various fields, such as exterior materials and parts of electrical and electronic products, automotive components, lenses and windows, which require both weather resistance and impact resistance. For example, the thermoplastic resin composition of the present invention can be used in the manufacture of automotive components, automotive exterior materials, and housings of electrical and electronic products, such as televisions, washing machines, cassette players, MP3 players, digital multimedia broadcasting (DMB) devices, navigation devices, mobile phones, telephones, game devices, audio players, computers, printers and photocopiers.

Hereinafter, the constitution and functions of the present invention will be explained in more detail with reference to the preferred embodiments of the present invention. The following examples are provided to assist in a further understanding of the invention and are in no way intended to limit the scope of the invention. Disclosures that are not included herein will be readily recognized and appreciated by those skilled in the art, and thus their explanation is omitted.

EXAMPLES

Production methods and specifications of components used in the following examples and comparative examples are as follows:

(A) Thermoplastic Resin (a1) Rubber-Modified Acrylic Graft Copolymer

A polybutyl acrylate rubber latex is added until the butyl acrylate content reached 42.5 parts by weight with respect to the total weight of all monomers. To a monomer mixture of 41 parts by weight of styrene, 16.5 parts by weight of acrylonitrile and 150 parts by weight of deionized water are added 1.0 part by weight of potassium oleate, 0.4 parts by weight of cumene hydroperoxide and 0.5 parts by weight of t-dodecyl mercaptan as a chain transfer agent. The resulting mixture is allowed to react at a temperature of 75° C. for 5 hr, yielding a graft latex. After 1% sulfuric acid solution is added to the polymeric latex, the mixture is coagulated and dried to obtain a powdered graft copolymer resin.

(a2) Aromatic Vinyl Copolymer Resin

A styrene-acrylonitrile (SAN) copolymer resin having a weight average molecular weight of 90,000 g/mol is produced by suspension polymerization of 65 parts by weight of styrene and 35 parts by weight of acrylonitrile at 75° C. for 5 hr.

(B) Branched Aromatic Vinyl Copolymer Resin Including Silicon Compound (B1) Branched Copolymer Resin Including Silicon Compound A styrene copolymer having a weight average molecular weight of 180,000 g/mol is produced by known suspension polymerization of 58.5 parts by weight of styrene, 31.5 parts by weight of acrylonitrile, 5 parts by weight of butyl acrylate and 5 parts by weight of a vinyl-modified dimethylsiloxane compound having a viscosity of 100 cPs and a vinyl content of 0.5 mmol/g.

(B2) Branched Copolymer Resin Including Silicon Compound

A styrene copolymer having a weight average molecular weight of 160,000 g/mol is produced by known suspension polymerization of 59.8 parts by weight of styrene, 32.2 parts by weight of acrylonitrile, 5 parts by weight of butyl acrylate and 3 parts by weight of a vinyl-modified dimethylsiloxane compound having a viscosity of 100 cPs and a vinyl content of 0.5 mmol/g.

(B3) Branched Copolymer Resin Including Silicon Compound

A styrene copolymer having a weight average molecular weight of 150,000 g/mol is produced by known suspension polymerization of 61.1 parts by weight of styrene, 32.9 parts by weight of acrylonitrile, 5 parts by weight of butyl acrylate and 1 part by weight of a vinyl-modified dimethylsiloxane compound having a viscosity of 100 cPs and a vinyl content of 0.5 mmol/g.

(B4) Branched Copolymer Resin Including Silicon Compound

A styrene copolymer having a weight average molecular weight of 160,000 g/mol is produced by known suspension polymerization of 56.5 parts by weight of styrene, 30.5 parts by weight of acrylonitrile, 10 parts by weight of butyl acrylate and 3 parts by weight of a vinyl-modified dimethylsiloxane compound having a viscosity of 100 cPs and a vinyl content of 0.5 mmol/g.

(B5) Branched Copolymer Resin Including Silicon Compound

A styrene copolymer having a weight average molecular weight of 160,000 g/mol is produced by known suspension polymerization of 59.8 parts by weight of styrene, 32.2 parts by weight of acrylonitrile, 5 parts by weight of butyl acrylate and 3 parts by weight of a vinyl-modified dimethylsiloxane compound having a viscosity of 200 cPs and a vinyl content of 2.0 mmol/g.

(B6) Branched Copolymer Resin Including Silicon Compound

A styrene copolymer having a weight average molecular weight of 130,000 g/mol is produced by known suspension polymerization of 59.8 parts by weight of styrene, 32.2 parts by weight of acrylonitrile, 5 parts by weight of butyl methacrylate and 3 parts by weight of a vinyl-modified dimethylsiloxane compound having a viscosity of 100 cPs and a vinyl content of 0.5 mmol/g.

(B7) Branched Copolymer Resin Including Silicon Compound

A styrene copolymer having a weight average molecular weight of 130,000 g/mol is produced by known suspension polymerization of 64.4 parts by weight of styrene, 34.3 parts by weight of acrylonitrile and 1 part by weight of a vinyl-modified dimethylsiloxane compound having a viscosity of 100 cPs and a vinyl content of 0.5 mmol/g.

(B8) Linear Copolymer Resin

A styrene copolymer having a weight average molecular weight of 130,000 g/mol is produced by known suspension polymerization of 61.8 parts by weight of a styrene monomer, 33.2 parts by weight of an acrylonitrile monomer and 5 parts by weight of butyl acrylate.

Examples 1-8 and Comparative Examples 1-4

Resins having the compositions described in Table 1 are produced. Each of the resins is melted, kneaded and extruded into pellets. A twin-screw extruder (L/D=29, diameter=45 mm) is used for extrusion. The pellets are dried at 70° C. for 6 hr and molded using a 6 Oz injection-molding machine to manufacture specimens.

Thereafter, the specimens are evaluated for impact strength, flow index, flexural modulus and weather resistance by the following methods. The results are shown in Table 1.

(1) Impact strength is evaluated using ⅛" thick notched Izod specimens as specified in ASTM D256.

(2) Flow index is measured under the conditions of 220° C. and 10 kg as specified in ASTM D1238.

(3) Flexural modulus is measured using ¼" thick specimens as specified in ASTM D790.

(4) Weather resistance is evaluated by measuring dE values for 3,000 hr in reference to SAE J 1960.

TABLE 1

| | | Examples | | | | | | | | Comparative Examples | | | |
|---|---|---|---|---|---|---|---|---|---|---|---|---|---|
| | | 1 | 2 | 3 | 4 | 5 | 6 | 7 | 8 | 1 | 2 | 3 | 4 |
| (A) | (a1) | 35 | 35 | 35 | 35 | 35 | 35 | 35 | 35 | 35 | 40 | 35 | 35 |
| | (a2) | 45 | 45 | 35 | 45 | 45 | 45 | 45 | 45 | 65 | 60 | 45 | 45 |
| (B) | (B1) | 20 | — | — | — | — | — | — | — | — | — | — | — |
| | (B2) | — | 20 | 30 | — | — | — | — | 10 | — | — | — | — |
| | (B3) | — | — | — | 20 | — | — | — | — | — | — | — | — |
| | (B4) | — | — | — | — | 20 | — | — | — | — | — | — | — |
| | (B5) | — | — | — | — | — | 20 | — | — | — | — | — | — |
| | (B6) | — | — | — | — | — | — | 20 | 10 | — | — | — | — |
| | (B7) | — | — | — | — | — | — | — | — | — | — | 20 | — |
| | (B8) | — | — | — | — | — | — | — | — | — | — | — | 20 |
| Izod Impact strength (kgf · cm/cm) | | 9.3 | 9.6 | 10.0 | 8.2 | 8.0 | 10.1 | 7.3 | 8.3 | 7.5 | 9.2 | 6.4 | 7.2 |
| Flow index (g/10 min) | | 16.3 | 16.5 | 16.7 | 14.8 | 17.1 | 13.8 | 18.2 | 16.5 | 14.2 | 11.2 | 13.5 | 17.6 |

TABLE 1-continued

| | Examples | | | | | | | | Comparative Examples | | | |
|---|---|---|---|---|---|---|---|---|---|---|---|---|
| | 1 | 2 | 3 | 4 | 5 | 6 | 7 | 8 | 1 | 2 | 3 | 4 |
| Flexural modulus (MPa) | 21900 | 21950 | 21640 | 22420 | 21280 | 23600 | 23060 | 22620 | 23400 | 22800 | 22900 | 22120 |
| dE | 2.2 | 2.4 | 2.0 | 2.2 | 2.0 | 2.3 | 2.1 | 2.2 | 2.6 | 2.1 | 2.3 | 1.9 |

In each of Comparative Examples 1 and 2, the rubber-modified acrylic graft copolymer (g-ASA) is blended with the aromatic vinyl copolymer resin (SAN). The results in Table 1 illustrate that although the composition of Comparative Example 2 shows improved impact resistance by the use of a larger amount of the g-ASA, flowability and mechanical significantly deteriorate.

In each of Examples 1 to 8, the branched styrene copolymer including the silicon compound is blended with the styrene copolymer (SAN) and the rubber-modified acrylic graft copolymer (g-ASA). The results in Table 1 demonstrate that the compositions of Examples 1 to 8 show improved impact resistance due to the increased molecular weight and the use of the silicon compound, improved flowability due to the branched structure, resulting in high moldability, and slightly improved weather resistance.

The compositions of Examples 1 and 2 show excellent impact resistance and flowability without any significant reduction in heat resistance and mechanical properties due to the presence of appropriate amounts of the (meth)acrylate and the silicon compound. Further, as the content of the branched copolymer resin in the compositions of Examples 2 and 3 increases, further improvements in impact resistance and flowability are attained.

The results of Examples 2 and 5 in Table 1 show that an increase in the amount of the acrylic monomer in the production of the branched copolymer led to improvement of flowability, indicating the applicability of the composition of Example 5 as a highly flowable material, despite deteriorated impact resistance.

The results of Examples 2 and 6 in Table 1 show that the use of the silicon compound having a higher viscosity and a higher vinyl content in the production of the branched copolymer led to improvement of impact resistance but is disadvantageous in the improvement of flowability.

The results of Examples 7 and 8 in Table 1 show that the use of the (meth)acrylate monomer in the production of the branched copolymer led to improvement of flowability without a deterioration in heat resistance but did not achieve improved impact resistance.

The composition of Comparative Example 3 using the silicon-containing branched copolymer containing no (meth)acrylate monomer and the composition of Comparative Example 4 using the linear copolymer resin containing no silicon show slightly increased flowability with little or no effect on impact resistance.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising: (A) about 10% to about 99% by weight of a thermoplastic resin comprising a rubber-modified acrylic graft copolymer, and (B) about 1% to about 90% by weight of a branched aromatic vinyl copolymer resin comprising a silicon compound, wherein the branched aromatic vinyl copolymer resin (B) comprises a copolymer or a mixture of copolymers formed of (b1) about 10% to about 85% by weight of an aromatic vinyl monomer, (b2) about 10% to about 85% by weight of an unsaturated nitrile monomer, (b3) about 1% to about 50% by weight of a (meth)acrylate monomer, and (b4) about 0.1% to about 20% by weight of a silicon compound having two or more unsaturated groups, wherein the silicon compound (b4) has a vinyl content of about 0.05 to about 10 mmol/g and a viscosity of about 5,000 cPs or less.

2. The thermoplastic resin composition of claim 1, wherein the branched aromatic vinyl copolymer resin (B) has a weight average molecular weight of about 5,000 to about 5,000,000 g/mol.

3. The thermoplastic resin composition of claim 1, wherein the aromatic vinyl monomer (b1) is styrene, p-methylstyrene, α-methylstyrene, halogen-substituted styrene, alkyl-substituted styrene, or a mixture thereof.

4. The thermoplastic resin composition of claim 1, wherein the unsaturated nitrile monomer (b2) is acrylonitrile, methacrylonitrile, ethacrylonitrile, phenylacrylonitrile, α-chloroacrylonitrile, or a mixture thereof.

5. The thermoplastic resin composition of claim 1, wherein the (meth)acrylate monomer (b3) is an aromatic (meth)acrylate, an aliphatic (meth)acrylate or a mixture thereof having a structure represented by Formula 1, Formula 2, or a mixture thereof:

Formula (1):

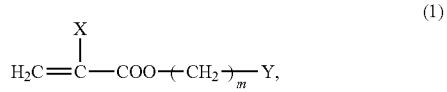

where m is an integer from 0 to 20, X is hydrogen or methyl, and Y is methyl, cyclohexyl, phenyl, benzyl, methylphenyl, methylethylphenyl, methoxyphenyl, cyclohexylphenyl, chlorophenyl, bromophenyl, phenylphenyl or benzylphenyl;

Formula (2):

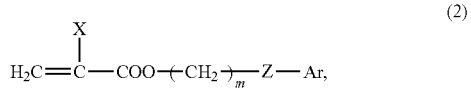

where m is an integer from 0 to 20, X is hydrogen or methyl, Z is oxygen (O) or sulfur (S), and Ar is phenyl, methylphenyl, methylethylphenyl, methoxyphenyl, cyclohexylphenyl, chlorophenyl, bromophenyl, phenylphenyl or benzylphenyl.

6. The thermoplastic resin composition of claim 5, wherein the aromatic (meth)acrylate, aliphatic (meth)acrylate or mixture thereof is methyl (meth)acrylate, ethyl (meth)acrylate, propyl (meth)acrylate, butyl (meth)acrylate, hexyl (meth)acrylate, 2-ethylhexyl (meth)acrylate, cyclohexyl methacrylate, phenoxy (meth)acrylate, phenoxyethyl (meth)acrylate, 2-ethylphenoxy (meth)acrylate, 2-ethylthiophenyl (meth)acrylate, 2-ethylaminophenyl (meth)acrylate, phenyl (meth)acrylate, benzyl (meth)acrylate, 2-phenylethyl (meth)acrylate, 3-phenylpropyl (meth)acrylate, 4-phenylbutyl (meth)acrylate, 2-2-methylphenylethyl (meth)acrylate, 2-3-methylphenylethyl (meth)acrylate, 2-4-methylphenylethyl (meth)acrylate, 2-(4-propylphenyl)ethyl (meth)acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl)ethyl (meth)acrylate, 2-(3-chlorophenyl)ethyl (meth)acrylate, 2-(4-chlorophenyl)ethyl (meth)acrylate, 2-(4-bromophenyl)ethyl (meth)acrylate, 2-(3-phenylphenyl)ethyl (meth)acrylate, 2-(4-benzylphenyl)ethyl (meth)acrylate, or a mixture thereof.

7. The thermoplastic resin composition of claim 1, wherein the silicon compound (b4) is at least one silicon compound having a structure represented by

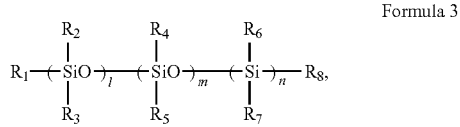

where l, m and n are each independently integers from 0 to 100, with the proviso that l, m and n are not simultaneously zero, and $R_1$ to $R_8$ are each independently hydrogen, straight chain or branched C1-C5 alkyl, C4-C6 cycloalkyl, C2-C12 unsaturated alkyl, C6-C10 aryl, hydroxyl, C1-C5 alkoxy, acetoxy, amino, amide, epoxy, carboxyl, halo, ester, isocyanate or mercapto, or $R_1$ and $R_8$ are bonded together to provide a cyclic structure, with the proviso that at least two of $R_1$ to $R_8$ comprise a polymerizable unsaturated group.

8. The thermoplastic resin composition of claim 7, wherein the silicon compound (b4) is 2,4,6,8-tetramethyltetravinylcyclotetrasiloxane, 1,3,5-trivinyl-1,1,3,5,5-pentamethyltrisiloxane, 2,4,6-trivinyl-2,4,6-trimethylcyclotrisiloxane, 1,3,5-trivinyl-1,3,5-trimethylcyclosilazane, α,ω-divinylpolydimethylsiloxane, polyvinylmethylsiloxane, 1,3-divinyl-1,1,3,3-tetramethyldisiloxane, or a mixture thereof.

9. The thermoplastic resin composition of claim 1, wherein the thermoplastic resin (A) further comprises an aromatic vinyl copolymer resin.

10. The thermoplastic resin composition of claim 9, wherein the aromatic vinyl copolymer resin is produced by copolymerizing of about 50% to about 95% by weight of an aromatic vinyl compound with about 5% to about 50% by weight of at least one compound selected from the group consisting of unsaturated nitrile compounds, alkyl (meth)acrylates, maleic anhydride and maleimide compounds.

11. The thermoplastic resin composition of claim 9, wherein the thermoplastic resin (A) comprises about 30% to about 55% by weight of the rubber-modified acrylic graft copolymer and about 45% to about 70% by weight of the aromatic vinyl copolymer resin.

12. The thermoplastic resin composition of claim 9, wherein the aromatic vinyl copolymer resin has a weight average molecular weight of about 15,000 to about 250,000 g/mol.

13. The thermoplastic resin composition of claim 1, wherein the resin composition has an impact strength (⅛" thick specimen) of about 7.3 to about 30 kgf·cm/cm, as measured using the ASTM D256 procedure, and a flow index (220° C., 10 kg) of about 10 to about 50 g/10 min, as measured using the ASTM D1238 procedure.

14. The thermoplastic resin composition of claim 1, further comprising at least one additive selected from the group consisting of surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, antistatic agents, pigments, dyes, flame-proofing agents, and mixtures thereof.

15. A molded article produced from the thermoplastic resin composition of claim 1.

* * * * *